(12) United States Patent
Waitz

(10) Patent No.: US 12,066,743 B2
(45) Date of Patent: Aug. 20, 2024

(54) METHOD FOR FOCUSING A CAMERA

(71) Applicant: QINEMATIQ GMBH, Vienna (AT)

(72) Inventor: Martin Waitz, Vienna (AT)

(73) Assignee: QINEMATIQ GMBH, Vienna (AT)

( * ) Notice: Subject to any disclaimer, the term of this patent is extended or adjusted under 35 U.S.C. 154(b) by 0 days.

(21) Appl. No.: 17/280,487

(22) PCT Filed: Sep. 26, 2019

(86) PCT No.: PCT/AT2019/060317
§ 371 (c)(1),
(2) Date: Mar. 26, 2021

(87) PCT Pub. No.: WO2020/061605
PCT Pub. Date: Apr. 2, 2020

(65) Prior Publication Data
US 2022/0030157 A1     Jan. 27, 2022

(30) Foreign Application Priority Data

Sep. 26, 2018   (AT) ............................. A 60156/2018

(51) Int. Cl.
*H04N 23/60*     (2023.01)
*G03B 13/20*     (2021.01)
(Continued)

(52) U.S. Cl.
CPC ............. *G03B 13/20* (2013.01); *G03B 13/30* (2013.01); *G03B 13/36* (2013.01); *G06F 18/21* (2023.01);
(Continued)

(58) Field of Classification Search
CPC ........ G03B 13/20; G03B 13/30; G03B 13/36; G03B 13/32; G03B 17/18; G06K 9/6267;
(Continued)

(56) References Cited

U.S. PATENT DOCUMENTS 5,526,082 A * 6/1996 Hirano ..................... G02B 7/32
396/51
6,104,398 A * 8/2000 Cox, Jr. .............. G06F 3/04847
715/860

(Continued)

FOREIGN PATENT DOCUMENTS

WO    WO-2009035632 A1 * 3/2009 ......... G06K 7/10544
WO    2017184056 A1    10/2017
(Continued)

*Primary Examiner* — Philip P. Dang
(74) *Attorney, Agent, or Firm* — Dykema Gossett PLLC

(57) ABSTRACT

Aspects of the present disclosure are directed to a method for focusing a camera. In one embodiment, the method includes: dividing the field of view of the camera in to at least two segments: assigning, in each case, at least one operating element or at least one position of an operating element to the at least two segments; recognizing and tracking at least one object in at least two segments; automatically assigning the recognized at least two objects to the respective operating element or position of the operating element depending on which segment the objects are assigned to; and focusing the camera on the object assigned to the operating element or the position of the operating element in response to the operating element being actuated or the operating element being brought into the corresponding position.

23 Claims, 6 Drawing Sheets

(51) Int. Cl.

| | |
|---|---|
| *G03B 13/30* | (2021.01) |
| *G03B 13/32* | (2021.01) |
| *G03B 13/36* | (2021.01) |
| *G06F 18/21* | (2023.01) |
| *G06F 18/24* | (2023.01) |
| *G06T 7/11* | (2017.01) |
| *G06T 7/246* | (2017.01) |
| *G06T 7/50* | (2017.01) |
| *G06V 10/40* | (2022.01) |
| *G06V 20/10* | (2022.01) |
| *H04N 13/271* | (2018.01) |
| *H04N 23/67* | (2023.01) |

(52) U.S. Cl.
CPC ............... *G06F 18/24* (2023.01); *G06T 7/11* (2017.01); *G06T 7/246* (2017.01); *G06T 7/50* (2017.01); *G06V 10/40* (2022.01); *G06V 20/10* (2022.01); *H04N 13/271* (2018.05); *H04N 23/67* (2023.01); *H04N 23/671* (2023.01); *G06T 2207/20021* (2013.01)

(58) Field of Classification Search
CPC ......... G06K 9/6217; G06T 7/11; G06T 7/246; G06T 7/50; G06T 2207/20021; G06V 10/40; G06V 20/10; H04N 5/23212; H04N 5/232121; H04N 13/271; H04N 5/2228; H04N 9/045; H04N 5/232; H04N 2013/0074
See application file for complete search history.

(56) References Cited

U.S. PATENT DOCUMENTS

| | | | | |
|---|---|---|---|---|
| 7,132,636 | B1* | 11/2006 | Cartlidge | G06T 3/00 250/216 |
| 7,162,101 | B2* | 1/2007 | Itokawa | G06T 7/12 382/199 |
| 7,544,137 | B2* | 6/2009 | Richardson | A63B 24/0021 273/317.2 |
| 8,134,637 | B2* | 3/2012 | Rossbach | G01S 17/894 348/336 |
| 8,937,651 | B2* | 1/2015 | Guissin | G02B 27/145 348/39 |
| 9,094,615 | B2* | 7/2015 | Aman | G06T 19/006 |
| 9,609,307 | B1* | 3/2017 | Lopez | G06T 7/557 |
| 9,824,455 | B1* | 11/2017 | Singh | G06T 7/174 |
| 9,836,635 | B2* | 12/2017 | Negro | G06K 7/1413 |
| 9,842,402 | B1* | 12/2017 | Mysore Vijaya Kumar | G06T 7/215 |
| 10,122,969 | B1* | 11/2018 | Lim | G06T 7/11 |
| 10,147,191 | B1* | 12/2018 | Ribeiro | H04N 23/632 |
| 10,274,610 | B2* | 4/2019 | Nelson | G01T 1/2002 |
| 10,275,024 | B1* | 4/2019 | Simmons | G06F 3/013 |
| 10,331,207 | B1* | 6/2019 | Simmons | H04N 13/383 |
| 10,440,276 | B2* | 10/2019 | Gupta | G06V 10/25 |
| 10,554,921 | B1* | 2/2020 | Lim | H04N 7/144 |
| 10,740,606 | B2* | 8/2020 | Metzler | G06V 30/1916 |
| 10,991,461 | B2* | 4/2021 | Divine | G06T 11/60 |
| 11,029,393 | B2* | 6/2021 | Li | G01S 7/4802 |
| 2008/0024594 | A1* | 1/2008 | Ritchey | H04N 23/58 348/E7.001 |
| 2009/0134221 | A1* | 5/2009 | Zhu | G06K 7/10544 235/462.14 |
| 2012/0056998 | A1* | 3/2012 | Kang | H04N 13/239 348/47 |
| 2015/0297949 | A1* | 10/2015 | Aman | G06T 7/246 348/157 |
| 2016/0088212 | A1* | 3/2016 | Narang | H04N 23/51 348/348 |
| 2017/0354883 | A1* | 12/2017 | Benedetto | G06T 19/20 |
| 2019/0268545 | A1* | 8/2019 | Inomata | H04N 23/959 |
| 2020/0368616 | A1* | 11/2020 | Delamont | H04N 13/239 |

FOREIGN PATENT DOCUMENTS

| | | | | |
|---|---|---|---|---|
| WO | WO-2017184056 | A1 * | 10/2017 | ............ G03B 13/18 |
| WO | WO-2017218306 | A1 * | 12/2017 | ............ A63F 13/211 |
| WO | 2018096811 | A1 | 5/2018 | |

* cited by examiner

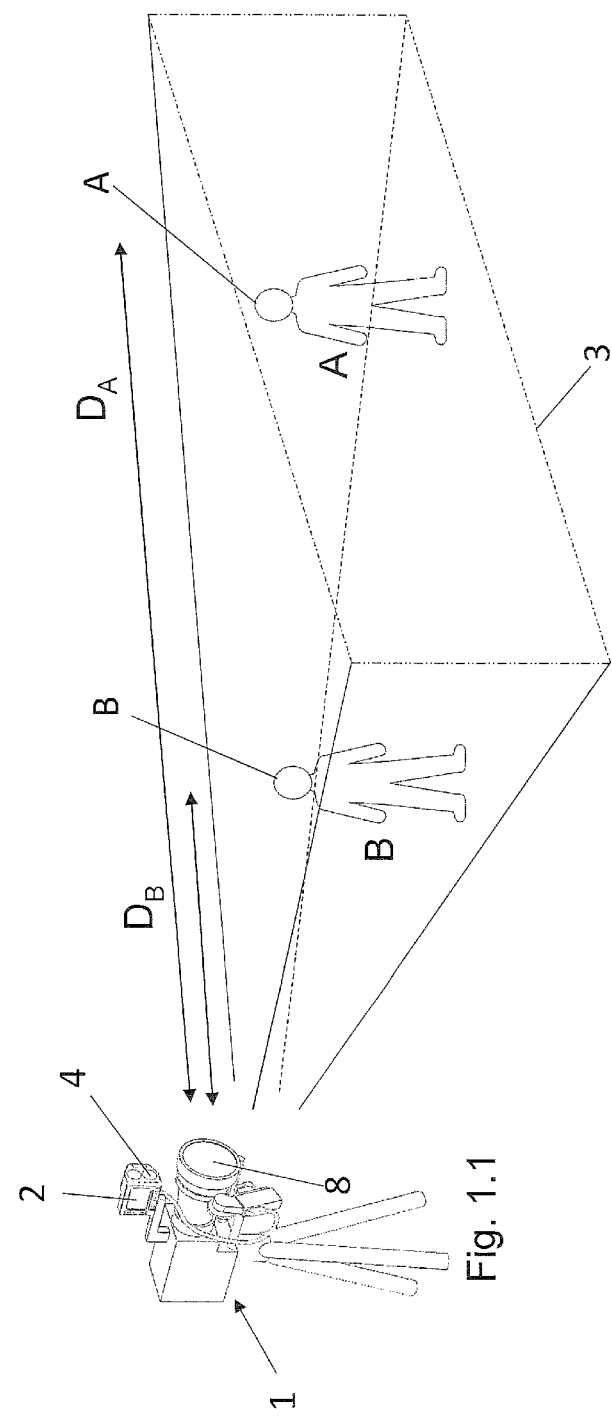

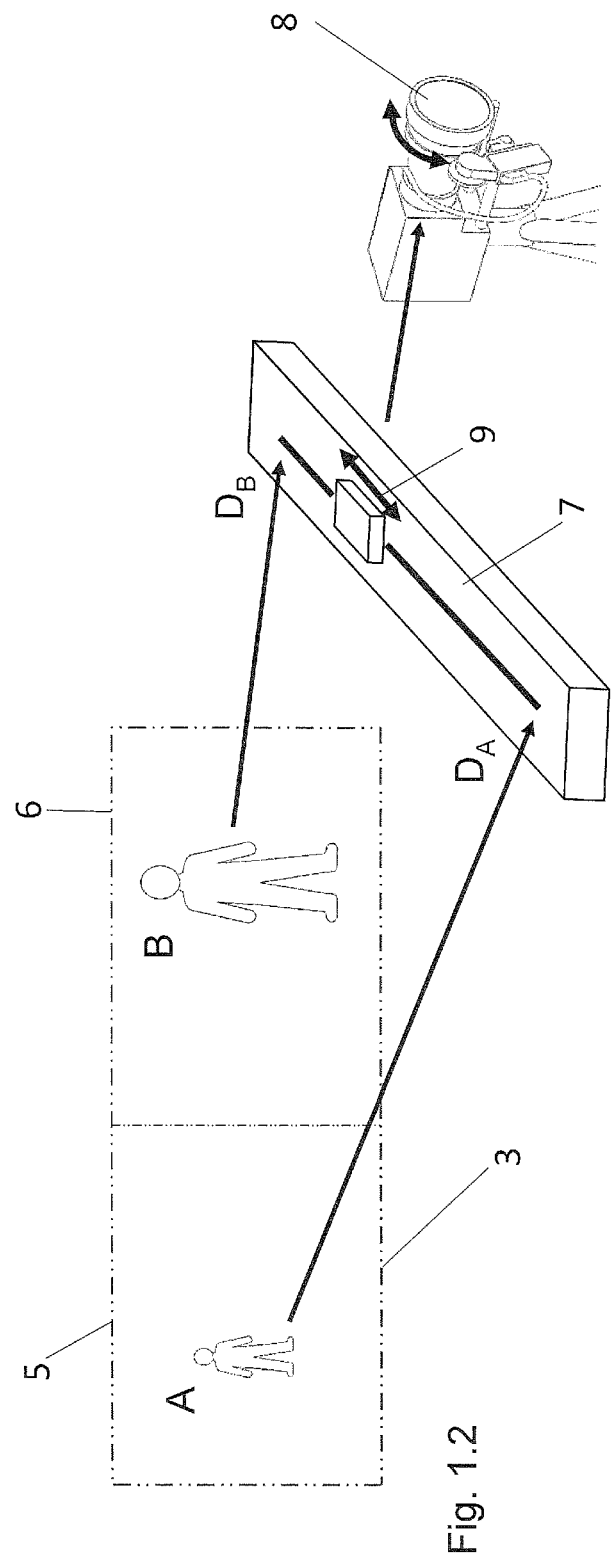
Fig. 1.2

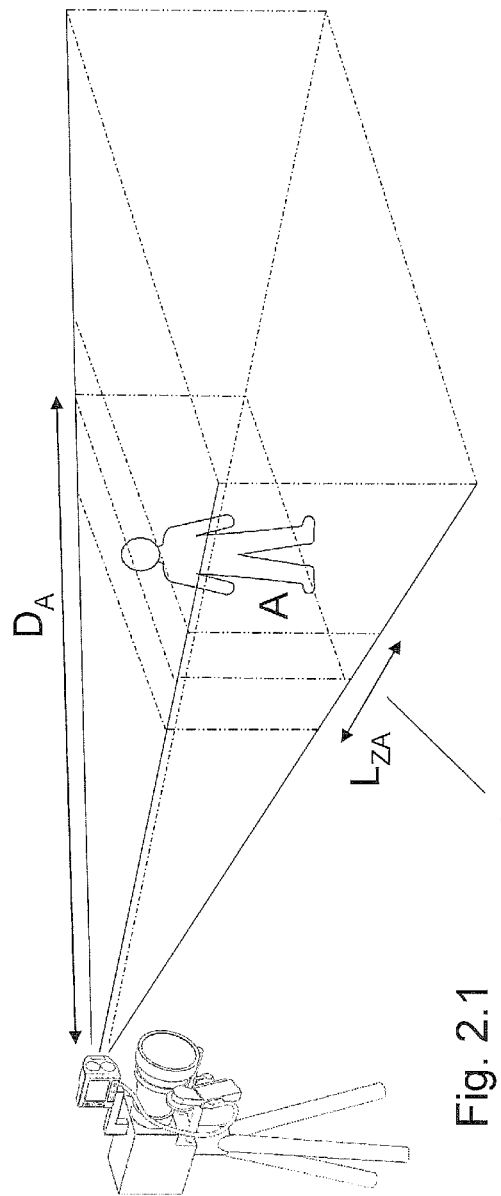
Fig. 2.1
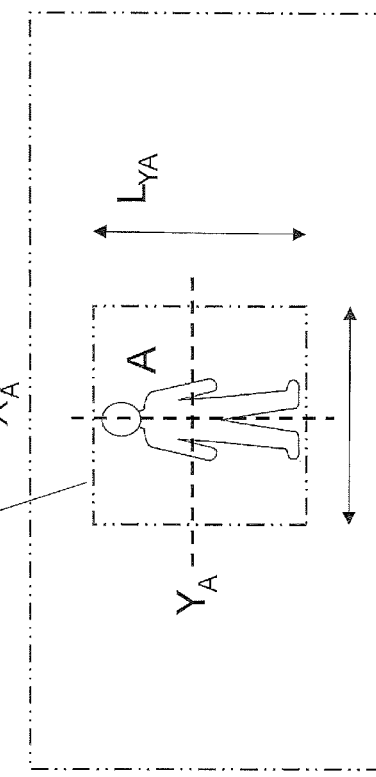
Fig. 2.2

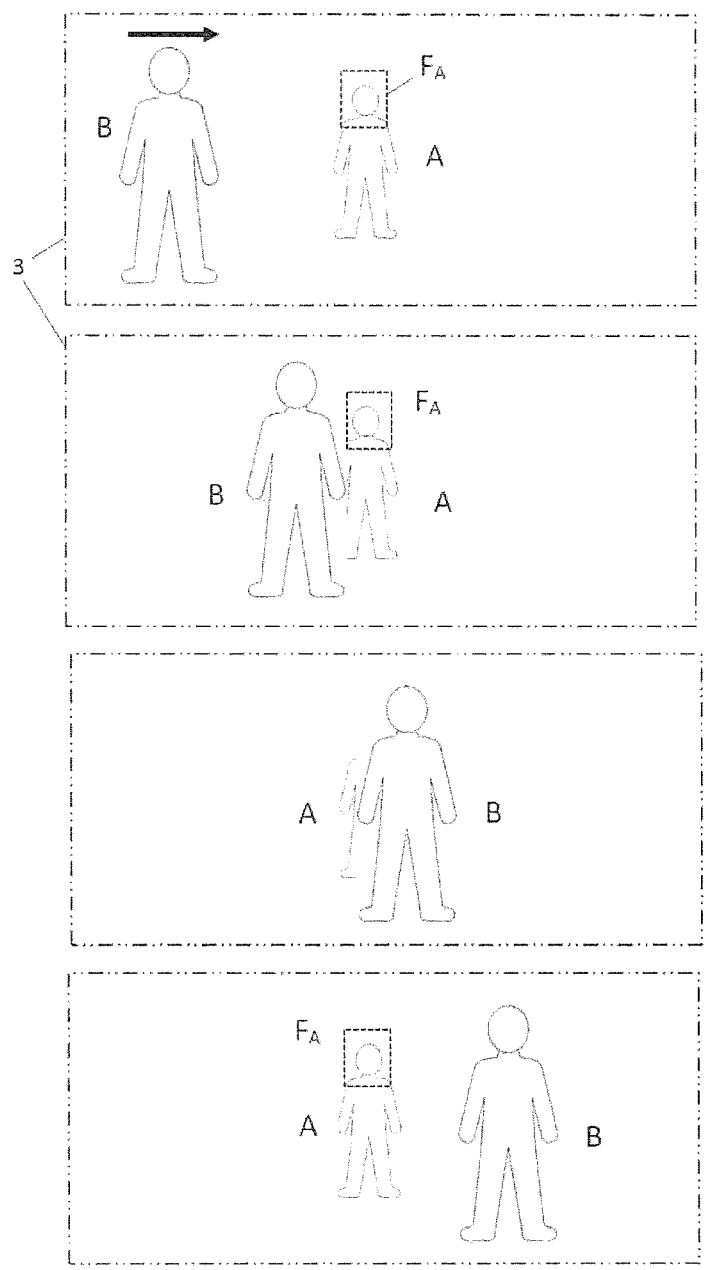
Fig. 2.3

METHOD FOR FOCUSING A CAMERA

CROSS-REFERENCE TO RELATED APPLICATIONS

This application is a national stage filing based upon International application No. PCT/AT2019/060317, filed 26 Sep. 2019, which claims the benefit of priority to Austria application No. A 60156/2018, filed 26 Sep. 2018.

BACKGROUND

Focusing, i.e. setting the focus area of a camera to a specific object or point in the field of view, is essential both for photography and for capturing moving images. In the case of moving images, i.e. film recordings, for example, it is a series of shots which are taken one after the other. In this way, the object or point is displayed sharply and clearly for the viewer and his attention is focused on it. For this purpose, objects are recognized by recognition algorithms or by manual assignment, the camera is focused on them and possibly also tracked, and the focus is readjusted accordingly. In particular, if there is more than one object in the camera's field of view, it can be useful to focus on one object for a while and then shift the focus to the other object.

WO 2017/184056 A1 describes a method for shifting the focus from a first object to a second object by using an operating element. For this purpose, these objects must first be defined by the user of the camera and then each assigned to an operating element, so that the user knows which object will be focused when the operating element is actuated. This is time-consuming and laborious for the user, and it also reduces concentration during filming. This is a particular problem when shooting movies that contain a large number of different scenes, where a new object recognition and assignment must be performed each time. This slows down the use of the camera, since the objects have to be marked first, and decreases the quality of the recording, since the user is mainly occupied with setting and assigning the objects and cannot concentrate on the filming itself. The user of the camera must perform the assignment before starting the recording to ensure an image focused on an object right from the start.

SUMMARY OF THE INVENTION

The object is thus to provide a method for operating a camera that enables reliable focusing.

This object is solved according to the invention in that the field of view of the camera is divided into at least two segments, and wherein at least one operating element or at least one position of an operating element is in each case assigned to at least the two segments and at least one object is in each case recognized and tracked in at least two segments, and the recognized at least two objects are automatically assigned to the respective operating element or position of the operating element depending on which segment they are assigned to, and when the operating element is actuated or the operating element is brought into the corresponding position, the camera is focused on the object assigned to the operating element or the position of the operating element.

It is also solved in such a way that the camera visually recognizes and tracks at least one object in the field of view of the camera, that depth data is detected in at least a portion of the field of view of the camera and is assigned to at least a portion of the image components of the field of view, and that at least a portion of the depth data are used for recognizing and tracking the at least one object.

Field of view or viewing area means the area which the camera captures, i.e. the area in its angle of view, which is depicted in the form of a two-dimensional or three-dimensional image.

Segment thus means a part of the field of view. If no depth data of the recorded area is captured, i.e. if the recorded image is two-dimensional, then the segments are preferably also two-dimensional. In the case of two-dimensional segments, they have an extension along the x-axis and the y-axis, i.e. along the side extension and height extension of the image, and are bounded by a side margin or side margins. If depth data are acquired and assigned to the individual points of the field of view, the segments can also be three-dimensional.

Object thus means an image component that is of particular interest, such as a group of people, a single person, a face, an eye, or even a vehicle, a bottle, or any other object or part of an object. The object can be recognized automatically, i.e. based on an algorithm, or by marking by the user.

Object tracking means in this case that an object that has been identified in one recording of the camera is searched for in subsequent images and is identified again there. This is particularly important for moving objects or when the camera is moving. The tracking of objects is also referred to as object tracking or tracking. Object tracking is subject to methods of computer vision or machine vision.

When dividing the field of view into segments, areas of the field of view can also not be assigned to any segment. In other words, at least two segments can be defined in the field of view. It can also be provided that these segments preferably do not overlap.

By automatically assigning the object depending on which segment it is in, i.e. depending on its position in the field of view, a clear and unambiguous automatic assignment is made for the user, which means that they no longer have to make the assignment themselves. This provides the user with intuitive, simple and fast operability. For example, a first segment can cover the left half and a second segment the right half of the camera's field of view, and a first face recognized in the first segment can be assigned to a first operating element and a second face recognized in the second segment can be assigned to a second operating element. The user thus already knows at the start of the recording which object will be focused on when he operates one or the other operating element. Of course, a large number of segments can be provided, which enables assignment to a large number of operating elements.

It can be provided that the camera automatically focuses on the first object in a certain segment when it is recognized. This is particularly advantageous at the beginning of the film, when no targeted focusing has yet been performed, since the first object is thus focused at the moment it is recognized and the image thus has a meaningful focus right at the beginning. In this case, a specific segment can be determined and the focus can be directed to the first object that is recognized or assigned in this segment. Alternatively, it can be provided that the focus is directed to that object which is recognized or assigned first in any segment. If additional objects are identified or defined after the first object, the focus may remain on the first object until the actuation of an operating element or other action or trigger causes the focus to change.

It can be provided that automatic object recognition is carried out in the entire field of view or at least part of the field of view, independently of the segments. This facilitates their assignment when they move into a segment.

The segments and also recognized or tracked objects can be displayed on a screen for the user. This allows the user to see where the segments are arranged, what shape they have and which objects are recognized and tracked and/or which object has been assigned to which operating element.

It can be provided that the segments can be defined by the user in the field of view in a setting step, preferably before the start of the recording. Various segmentations can also be suggested to the user for selection.

Preferably, each segment is assigned exactly one operating element or the position of an operating element. However, it can also be provided to assign several operating elements to at least one segment. This allows several objects identified in a segment to be assigned to the various operating elements of the segment in a defined manner. This can be carried out, for example, from left to right, in the field of view, from front to back, or in the order of identification or assignment.

It can be provided that the first object recognized in a segment is assigned to an operating element or position of an operating element, and the next object in this segment is assigned to another operating element or position of an operating element assigned to it. This can be carried out until all operating elements are assigned to objects in the segment. If further objects are identified in the segment afterwards, it can be provided that these are not assigned to any operating element or position of an operating element. It is immaterial whether the object is located in the segment at the moment of the first recognition or has already been recognized in previous shots and enters the segment by tracking through the movement of the object.

It is particularly advantageous if this automatic assignment of at least two objects to a respective operating element or position of an operating element is maintained when at least one object moves to another segment to which it is not assigned. In other words, in a first or initiating step, the described assignment of the objects to the operating element or position of the operating element can be made and then maintained in further sequence. This assignment can be made by a specific event, such as actuating a set operating element, turning the camera off and on again, the object leaving the viewing area, preferably over a certain minimum time, or identifying new objects. However, this assignment can also occur when the object itself appears in a certain sector, or is identified in a certain sub-sector of the sector. In this way, the assignment is prevented from being changed during the recording by the movement of the objects in the field of view. This is because after the first step of automatic assignment, the user—who knows or can also be shown where the segments are set—is aware of which object is assigned to which operating element and may wish to maintain this assignment, regardless of the current position of the objects in the field of view.

The operating elements can be designed in different ways, but it is essential that they have at least two defined positions that they can assume, for example like buttons or keys. In this sense, it is advantageous if at least one operating element is a knob, rotary knob, joystick or slider with at least two positions. A slider means an operating element that can be brought into at least two defined positions by moving or turning it along at least one direction. Thus, by moving it from one position to the other, a transition of the focus can be controlled, preferably by the user. Thereby, preferably the speed of the transition of the focusing is dependent on the speed of movement of the slider.

The operating elements can also be part of a graphical user interface. The buttons, the slider or rotary control, a joystick, etc. can thus be elements recorded on a screen, which are moved or triggered via touchscreen, mouse or similar controls, for example.

If the segments are assigned to different positions of an operating element, it is advantageous if moving the operating element in the direction of at least one position shifts the focal plane in space in the direction of the object assigned to the position. If the segments are assigned to different operating elements, it is advantageous if actuating an operating element automatically shifts the focus to the plane of the object assigned to this operating element.

Preferably, the objects are recognized automatically. This means that a computing unit of the camera, the camera system or the 3D sensor recognizes the objects without the user having to mark and thus define the objects individually in the field of view.

In this case, a certain type of object can be preset for one or more segments. For example, it can be provided that the user can set for each segment whether an occurring object can be a face, a car and/or a bottle.

In this sense, it may be provided that object recognition includes feature analysis in which visual features of an object in an area are searched, analyzed, and identified, and the object is recognized based on these features and their movement is tracked. In other words, feature tracking is performed, i.e. features of a certain type are searched for in the field of view or part of the field of view and an object is recognized based on these features. These features are visual features in the image and can be, for example, certain colors, edges, contours, textures, contrasts, or characteristic combinations of shapes and colors such as a face or eyes. Based on these features or the combination of such features, possibly also depending on their respective positions (for example a defined distance between two eyes and a nose to recognize a face), an object can be recognized and distinguished from the rest of the image, as well as tracked. In this context, the area can be the segment, another part of the field of view, or the entire field of view.

It can also be advantageous if the object recognition includes recognition via a deep-learning algorithm. Deep-learning algorithm refers to the processing of recorded image data by a multi-layered neural network that has been trained in advance using a large number of sample data sets. For example, the deep-learning algorithm can be trained to recognize persons or exactly this particular person by inputting very many images of persons or a particular person from different perspectives, with different facial expressions, different exposures and the like. These learned objects are available in networks and are used by the algorithm to identify objects in the images. By processing recorded data, features and/or even objects can be recognized directly.

It is very advantageous if already trained data sets or networks can be used. For example, trained data sets are available for the human body, the face, or the limbs (e.g., in the skeleton tracking method). This means that with the help of existing deep-learning algorithms, people as well as objects can be automatically recognized and tracked in an image in a very reliable and robust manner.

It can further be provided that at least one object is marked by the user, the algorithm of a computing unit of the camera, the camera system or the 3D sensor recognizes the features of this object and the object is tracked on the basis of its features. From image to image, the features change only slightly even if the object moves, and they can thus be identified in the subsequent image. Through such feature detection, an object can be easily defined and tracked. This is especially useful for objects that are not usually tracked or that are difficult or poorly recognized by a deep-learning algorithm or feature tracking.

The object recognition and tracking methods described can, of course, be used in any combination, thus reducing their drawbacks and/or inaccuracies.

In general, cameras record a two-dimensional field of view, with an x-axis and a y-axis spanning the two-dimensional field of view.

It is particularly advantageous if depth data is recorded in at least part of the camera's field of view and at least some of the image components of the field of view are assigned to this depth data, and before the assignment preferably another camera records a real image and at least some of the image components of the real image are assigned to the depth data. In this case, depth data means distance data of individual pixels or image components to the camera. In other words, this is distance data along a z-axis which is normal to a plane spanned by an x-axis and a y-axis. Depth data can be assigned to each image component, for example, to each pixel. By assigning depth data, more information about the image is available, which can facilitate processing of the image. For example, it is particularly advantageous if depth data of the objects is used to adjust the focus. This can speed up and improve the focusing process.

It is also advantageous if the depth data of the objects are permanently recorded. This allows automated and fast refocusing from one object to another, since both distances are permanently known and do not have to be determined during the focusing process (as is usually the case). The movement of the operating element preferably determines the duration of the focusing process. This results in a uniform focus ramp in space.

It is particularly advantageous if the segments are at least partially delimited not only by side edges but also by depth edges. This delimits the segments three-dimensionally. Segments can thus also be arranged one behind the other along the z axis. This allows even better segmentation and more design freedom in focusing for the user. Side edges mean edges of two-dimensional field of view, i.e. edges that span between the x-axis and y-axis.

Furthermore, it can be provided that the acquisition of the depth data is at least partially performed via at least one 3D sensor, which is preferably attached to the camera.

A calculation unit can use a 3D sensor to generate a matrix of distance values. For example, the 3D sensor can consist of a stereoscopic camera array, TOF camera, laser scanner, lidar sensor, radar sensor, or combination of different 3D sensors to improve measurement quality, range, and resolution.

Preferably, it is provided that another camera takes a real image and at least a part of the image components of the field of view are assigned to the depth data. Thus, at least a part of the pixels of the real image is assigned to at least a part of the respective depth data, whereby the distance of this pixel to the camera is known. For this purpose, the 3D sensor preferably has an additional camera which generates a real image and which is therefore referred to here as a real image camera. The 3D sensor and the real image camera are preferably mechanically fixed to each other and calibrated. The display perspectives are preferably the same. Thus, a distance value can be assigned to each recognizable pixel of the real image camera. This assignment is called depth image. Preferably, this real-image camera has an infinitely large depth-of-field range in order to be able to sharply depict all objects in the image. Preferably, this real-image camera has a large exposure range (e.g., through an HDR mode) in order to be able to image subjects of varying brightness uniformly. Alternatively, the image of the camera can be used to create the depth image, in other words, the camera can represent the further camera.

It is advantageous if the acquisition of depth data includes the triangulation of data from at least two auxiliary cameras. In this case, the camera itself can also be one of the auxiliary cameras. The auxiliary cameras are preferably arranged at a defined distance and are positioned at a defined angle to each other so that triangulation is easily possible.

In a preferred orientation, the optical axis of the 3D sensor is arranged parallel to the optical axis of the camera to achieve an orthogonal measurement of depth data to the optical axis of the camera.

It is also particularly advantageous if the depth image of the 3D sensor is at least partially calculated into the image of the camera. This means that the perspectives of the images can be merged.

The spatial assignment of a part of the camera's field of view can also be performed by position sensors attached to the subject. Such position sensors can be, for example, microwave, radar or sound sensors or transponders, which enable distance and angle determination in relation to a base station using various physical methods, such as runtime measurement, phase measurement or field strength measurement. If the base station is attached to the film camera, such sensors can be used to determine the spatial position of the subject in space.

All of these methods can be used to determine the distance between the camera and a portion of the field of view, thus assigning a distance to each portion of the field of view.

If it is intended to visually track an object in a video image, one is confronted with the fact that the object can often disappear from the camera's field of view. Simple tracking algorithms, such as eye, field of view or person tracking, often have the following disadvantages:

The object to be tracked is partially or completely covered by another subject or by other objects for a short time or longer.

The object to be tracked leaves the field of view of the camera and comes back into view after a short or longer period of time.

The object to be tracked rotates, or the film camera moves around the object, changing the features of the object to a very high degree. For example, eyes or the face or the certain features are no longer visible in the image. Here the tracking algorithm may lose its target object.

A feature of an object is covered, or is no longer visible in the real image. If there is another object with the same or very similar features in the camera's field of view, the tracking algorithm must not jump to the similar object. Here, the tracking algorithm must be prevented from jumping to a subject with similar features if the features of the original object are no longer visible.

In general, the following disadvantages arise if the real image of the film camera itself were used to track an image area:

Film lenses have a small depth-of-field range. They also display desired areas in the image very blurred. However, if image areas are out of focus, tracking cannot be performed in these areas because objects in the video image cannot be recognized and analyzed. If it is intended to move the focal plane from area A to area B, this may not be possible because area B is not recognized because it is blurred in the real image of the film camera. An object selection in the real image of the film camera can be problematic or even impossible.

Some areas in the real image of the film camera are exposed in such a way that no image analysis can take place in these areas.

Thus, it is particularly advantageous if a tracking algorithm for moving objects in front of the camera is built to be very robust against various disturbances.

The invention also relates to a method for tracking objects in video or film cameras. The main feature is a support or fusion of different tracking algorithms, in particular the inclusion of depth data.

According to the invention, the tracking process consists of the following steps:

Image capture:
  A real image and a depth image are generated in a 3D sensor.

Transformation/Rectification:
  If the real image and the depth image are generated by 2 different sensors or by the camera itself, they must be brought into agreement. This means that a pixel of the real image should be assigned the corresponding depth value. This is carried out by image transformation and rectification based on the parameters of the sensors, the optics and the geometrical arrangement to each other.

Segmentation
  Contiguous areas can be extracted from the depth image. Individual objects/subjects in the room are grouped together as segments based on their common (similar distance). Layers (such as floor or walls) can be combined into segments. This allows interesting subjects to be delimited from uninteresting subjects.

Prediction
  A computational prediction of the motion information is made based on the previous images and on the physical laws of the objects to be tracked (objects can only move by a speed of vmax in relation to the video camera)
  The prediction results in a possible distance range $L_{XYZ}(n)$, in which the object can be located. For very short scanning intervals, the distance range is very small and the prediction accuracy of where the object is located is very high.

Region determination
  From the prediction of the distance all image areas of the real image can be excluded, which lie outside the distance range $L_{XYZ}(n)$. This means that in the real image all image areas can be faded out which definitely do not lie in the area of the prediction.
  From the segmentation of the depth image, regions can be extracted from the real image, on which the tracker can fix. For example, floors, walls or the background can be hidden in the image region. This allows the interesting areas of the real image to be restricted again.
  With both measures, the image area of the real image is very limited where to look for the object. The tracking algorithm becomes very robust due to the prediction and segmentation by the depth image.
  The transformation/rectification (scale-accurate, distortion-corrected and correctly aligned image) of the depth image into the real image is a condition of this region determination.

Object tracking/Tracking
  The camera image pre-processed in this way can now be fed to the object tracking. Possible tracking algorithms are, for example, deep-learning algorithms or feature detection.
  Tracking can be carried out based on different features, such as person, limbs (skeleton tone), face, -head/shoulder-, eyes.

It is also particularly advantageous if at least part of the depth data is used to recognize and track at least one object. The differentiation of objects and/or their delineation from the environment can be improved. This speeds up object recognition and reduces the error rate, thereby leading to improved usability. In particular, this depth data can be advantageous during tracking, for example, when an object temporarily leaves the field of view.

Visual recognition and tracking means that recognition and tracking are based at least in part on visual data, i.e. on image data. The depth data can be included as supporting additional information.

It can be provided that the depth data is at least partially recorded by a 3D sensor on the camera. This provides a simple means of recording the depth data. Recording in the area of the camera is particularly advantageous, as this makes it easier to link the depth data with the image data of the camera. Preferably, the 3D sensor is brought into a defined position and distance from the camera.

Furthermore, it is advantageous if at least one segment is defined in the field of view of the camera and is focused on a recognized and tracked object as soon as it is located in the segment. This automatically sets the focus on an object that is highly likely to be important. It can be provided in this case that only a defined, recognized and tracked object or object of a defined object class is focused on as soon as it is located in the segment.

In a preferred embodiment, it is provided that at least one object is assigned a maximum range of motion per unit of time and this range of motion is included in object recognition and object tracking. This allows objects to be tracked better and more robustly, and to be recognized even if they are temporarily obscured. Physically, it is impossible for objects to suddenly appear in a different sector when moving because they are subject to maximum velocity or acceleration. Thus, if an object is covered by another object while tracking in the video image, and this covering object is similar to the original object, the tracking algorithm may jump to the new object. Physically, however, such a jump cannot usually be possible if the position jump is above a maximum possible acceleration of the motion vector in space.

The maximum range of motion per time, for example the maximum range of motion per single shot, makes it easier to find the object in the field of view from shot to shot, since the range of motion limits the area in which the object can be located. However, this margin does not have to be an absolute constraint, but can serve as a weighted single aspect among multiple aspects (such as feature tracking) to identify and track the object. In other words, the tracking is stabilized by the spatial segmentation in x,y- and/or z-direction by a maximum possible movement range. Thus, the primary tracking algorithm is supported by a spatial component.

It is also possible to measure the speed, direction of movement and/or acceleration of an object and include this in the object tracking. This makes it easier, for example, to re-recognize an object that is moving at a known speed in the field of view and temporarily disappears behind an obstacle after it emerges on the other side of the obstacle. It is particularly advantageous if the original assignment to the operating element or position of the operating element is maintained.

With the introduction of a motion range and the spatial subdivision of the camera's field of view into segments, it is possible to a certain extent to automatically detect and track objects that leave the field of view again by the spatial assignment of the objects upon re-entry, as long as they re-enter the image within the motion range.

Furthermore, it is advantageous if at least one object is assigned to an object class and the movement range is selected depending on the object class. The movement range can be dependent on the type of object or can be set individually for the user. Different features can be stored in a database for different object classes, which are preferably searched for.

BRIEF DESCRIPTION OF THE DRAWINGS

In the following, the present invention will be explained in more detail with reference to a non-limiting embodiment variant shown in the figures, wherein:

FIGS. 1.1 and 1.2 show the method according to the invention and a device using the method according to the invention in a first embodiment in schematic views;

FIG. 2.1 shows the method according to the invention and a device using the method according to the invention in a second embodiment in a schematic view;

FIG. 2.2 shows the field of view of the second embodiment;

FIG. 2.3 shows the field of view of the second embodiment during the movement of an object.

DETAILED DESCRIPTION

Figure 3:
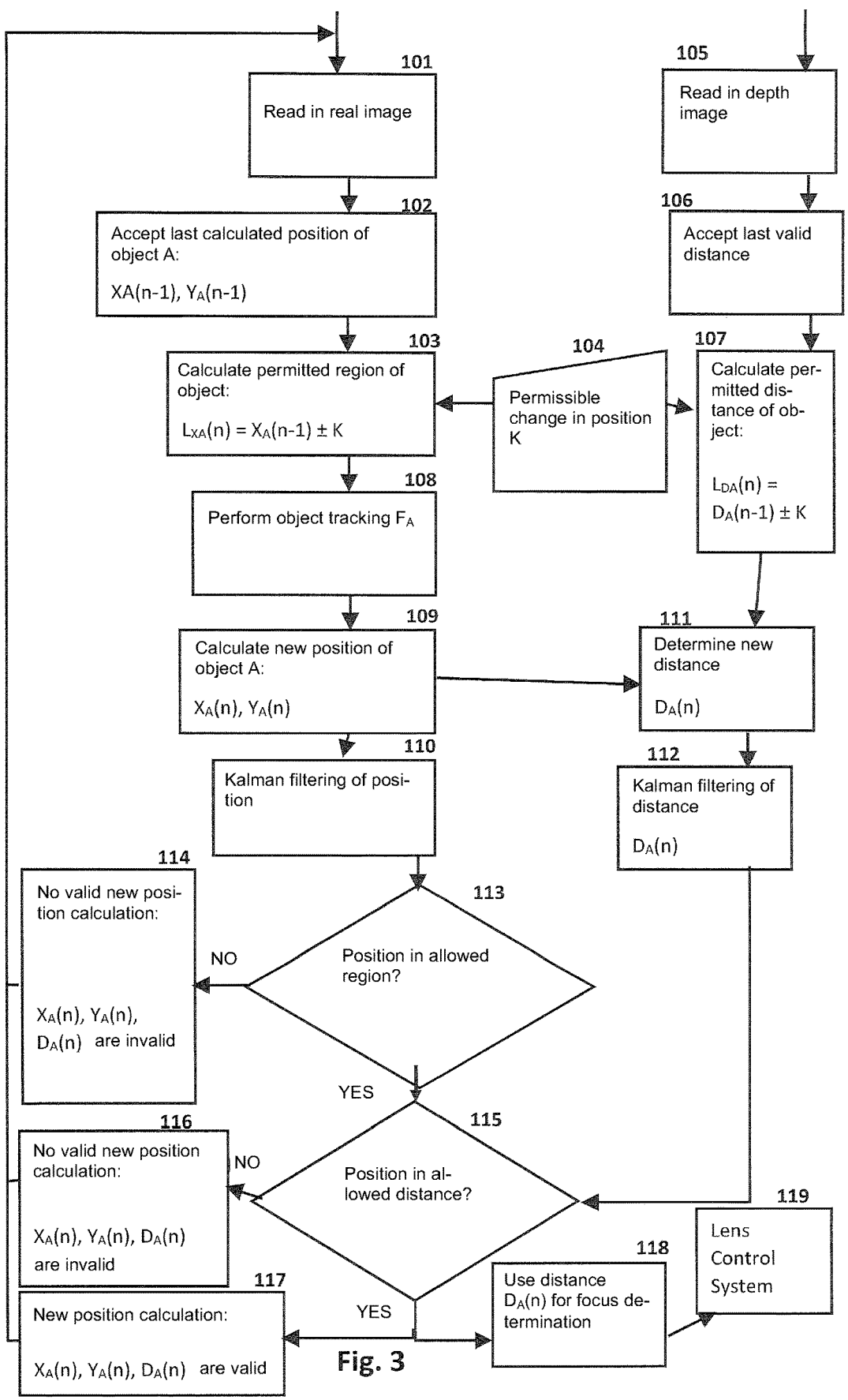
FIG. 3 shows a block diagram of a tracking process in an embodiment according to the invention for focusing a camera.

In FIGS. 1.1 and 1.2 the method is explained in more detail using a first embodiment.

2 persons A and B are standing in the field of view 3 of camera 1. These persons represent objects that are to be traced, i.e. tracked. A 3D sensor 2 is attached to the camera 1. In the 3D sensor 2, there is a further camera 4 designed as a real image camera 4. In the video image of this real image camera 4, the persons can be automatically tracked in an existing computing unit with the help of known tracking algorithms (for example a deep-learning algorithm, skeleton tracking, . . . ) as soon as the process is started by the user.

For example, the field of view 3 of the camera 1 can be divided into 2 segments—a left segment 5 and a right segment 6. This means that person A can be assigned to the left segment 5 and person B to the right segment 6. Since the real image of the 3D sensor 2 is stored with depth values, i.e. for each image area or pixel of the real image there is also depth information, the distance of the persons can be determined from the tracking points by the 3D sensor 2. For this purpose, the person is summarized as a common object. This is represented by distance $D_A$ for person A and distance $D_B$ for person B. Person A is drawn further back and thus smaller. The left segment 5 is assigned to a first position of an operating element and the right segment 6 to a second position of the operating element. In this embodiment, the operating element is a slider and the first position is the left stop and the second position is the right stop. The corresponding distance $D_A$ is assigned to the left stop of a slider 7, since person A is standing in front of the camera in the left segment. The distance $D_B$ is assigned to the right stop of the slider. From the distances, the corresponding position on the focus lens 8 can be calculated and set in a lens control unit. The focus lens 8 is moved to the corresponding position and focused. Distance $D_A$ focuses on object A, distance $D_B$ focuses on object B. If the slider 7 is now moved from the left stop, which corresponds to object A, to the right stop (arrow 9), the focal plane moves from object A to object B in space. The movement of the slider thus corresponds to a focus ramp, i.e. how fast the focus should move from object A to object B. If the objects A, B move in space, the tracking points follow them automatically, thus also the distances and it is still possible to move the focus from object A to object B at the slider without the user having to redefine the distances to the objects. With this method, the user can perform the timing and duration of the focus shift very easily and intuitively, since he only has to move one operating element 7 and does not have to concentrate on the objects themselves.

The field of view 3 of the camera 1 could also be divided into a front and rear segment, and thus object A or object B could be automatically assigned to a stop of a slider. If the assignment has been carried out, it remains in force even if the objects move.

It is also possible to set a maximum distance from which no objects will be tracked. This makes it possible to track only objects in the foreground and ignore all objects in the background.

In FIGS. 2.1, 2.2 and 2.3 the method is explained in practice in a second embodiment.

A person A representing an object is standing in the field of view 3 of a camera 1. A 3D sensor 2 is attached to the camera 1. A real image camera 4 is located in the 3D sensor 2. In the video image of this real image camera 4, the person can be automatically tracked in an existing computing unit using known tracking algorithms (for example, a deep-learning algorithm, skeleton tracking, face tracking, feature detection, . . . ) as soon as the process is started by the user. Since the real image of the 3D sensor 2 is stored with depth values, i.e. for each image area or pixel of the real image a depth information is available, the distance of the persons A can be determined from the tracking points by the 3D sensor 2. The tracking algorithm could also run on the video image of the camera 1, if the image of the camera has been stored with depth information. In this case, as described, the real image of the 3D sensor 2 can first be stored with the depth values and then this can be combined with the image of the camera 1, or the depth values can be stored directly with the image of the camera 1. From the measured distance, the corresponding position on the focus lens 8 can be calculated in a lens control unit. The focus lens 8 is moved to the corresponding position and focused. If the person A moves in space, the tracking point automatically follows him, thus the distance and the focus is automatically placed on the moving object.

From the distance $D_A$ of person A, the tracking algorithm can now be made more robust but also more efficient and faster. Depending on its physically possible speed, the person can only move within a certain movement range in space at a certain sampling time, which preferably corresponds to the recording time of the video image. The tracking algorithm can thereby assign the object to an object class, in this case the class "person", and retrieve a maximum movement range 10 depending on the class. Person A can have moved from one image to another only with $L_{XA}$ in x-direction and $L_{YA}$ in y-direction to the previous image. Regions outside this segment are not possible. If the tracking algorithm would position another position in the x/y plane of the image in case of an error, this can be excluded. The tracking region of the current image must be in the $L_{XA}$ and $L_{YA}$ segment.

The detection of the depth by the 3D sensor 2 proves to be particularly advantageous. Person A can only move in the z direction by $L_{ZA}$. Any movement outside this margin is physically impossible and can be excluded.

The example in FIG. 2.3 shows the advantage. Person A is detected by face tracking. The face tracking is marked with $F_A$. If a $2^{nd}$ person now enters the image, face tracking would also be performed here. However, this tracking position does not need to be considered because it is outside the possible region. If person B is closer to camera 1 and moves through the image, person B covers person A partially or completely. Face tracking is no longer possible with coverage at person A. Even now, the tracking position does not jump to the face of person B, although the tracking position of face B would be the same or similar to the position of face A. In spatial direction, however, it would be a distance jump, which is not possible. Therefore, the position of the focus does not change. In most cases this is not a problem, because person A is covered in the image and therefore not visible. If person B releases person A in the image again, face tracking $F_A$ is again possible here and a corresponding distance is determined. If person A has moved a little in the meantime, the focus can jump to this position, or it is shifted to the corresponding position by a temporal ramp. The 3D sensor 2 also determines the speed of the objects in space. If person A is covered, the future position in space can be inferred from their previous speed and the focus can be moved further even if they are covered.

If person A and person B are already in the field of view 3 at the start point, the user can alternate between the tracked face positions by simply pressing a button and thus set the start position to face $F_A$.

It is also possible to set a maximum distance from which no more people or objects are tracked. This makes it possible to track only objects in the foreground and ignore all objects in the background.

Due to the existing depth image, it is possible to black out (fade out) all areas in the image that are not within the specified limit. The regions where the tracking algorithm has to search for the target in the image can thus be greatly restricted. It becomes more robust and efficient.

FIG. 3 shows a block diagram of a section of a possible object tracking. This represents a processing possibility in a processing logic for tracking objects.

In order to make the tracking algorithm more robust with depth data, there are 2 ways: Prediction and region determination.

FIG. 3 shows the process by region determination in a flowchart.

In this case, in a first step, an image of the camera 4 is read in (101). This can also be the image of camera 1 if the camera is calibrated with the 3D sensor with respect to each other, i.e. the depth data of the 3D sensor 2 can be matched with the image areas of camera 1 with perspective accuracy. In the next step, the last validly calculated position of the tracked object A is adopted (102). The position of the object A last calculated by the tracking algorithm (108) is transferred to this image (101). With the help of the allowed position change K (104) per sampling interval, the region can be calculated in which the new position of the object is allowed (103). The permissible position change can be determined in a fixed manner depending on the object, or can be entered by the user before the start point or changed during the running process. Likewise, the depth image (105) is read in by the 3D sensor 2. The last valid distance is adopted (106). The region in which the new distance of the object may be located (107) can be calculated from the permitted position change K (104).

After this preparation, a new tracking process is started in the real image (108). It can be any algorithm. In the example, a face of a person is searched for. A face tracking $F_A$ is performed. The tracking algorithm returns a new position X(n), Y(n) along the x- and y-axis of the image (109). A subsequent Kalman filtering is used to stabilize the position (110). In the next step, it is checked whether the new position is within the range $L_{XA}(n)$ and $L_{YA}(n)$, which indicate the limits of the allowed region (113). If the new position (n) is outside the boundaries, no valid position determination has taken place (114). This means that an object has been found in the image which cannot be the previous object because the change in position has been above the physically specified rate of change K. The position determination is discarded. The last valid position (n−1) remains valid.

Likewise, a new distance is determined (111) using the new position (n) (109) in the depth image. This distance is also stabilized with a subsequent Kalman filtering (112). Again, it is checked if the new calculated distance is within the possible limits $L_{DA}(n)$ (115). If the change in distance is greater than would be allowed, the new position determination is discarded again (116). The last valid position (n−1) remains valid. Only if the position is in the possible region (113) and in the allowed distance (115) a valid tracking has taken place and this new position and the new distance are made available to the algorithm for a further calculation step (117).

The new valid distance $D_A(n)$ is used for the focus adjustment (118) and transmitted to the lens control system (119).

Figure 4:
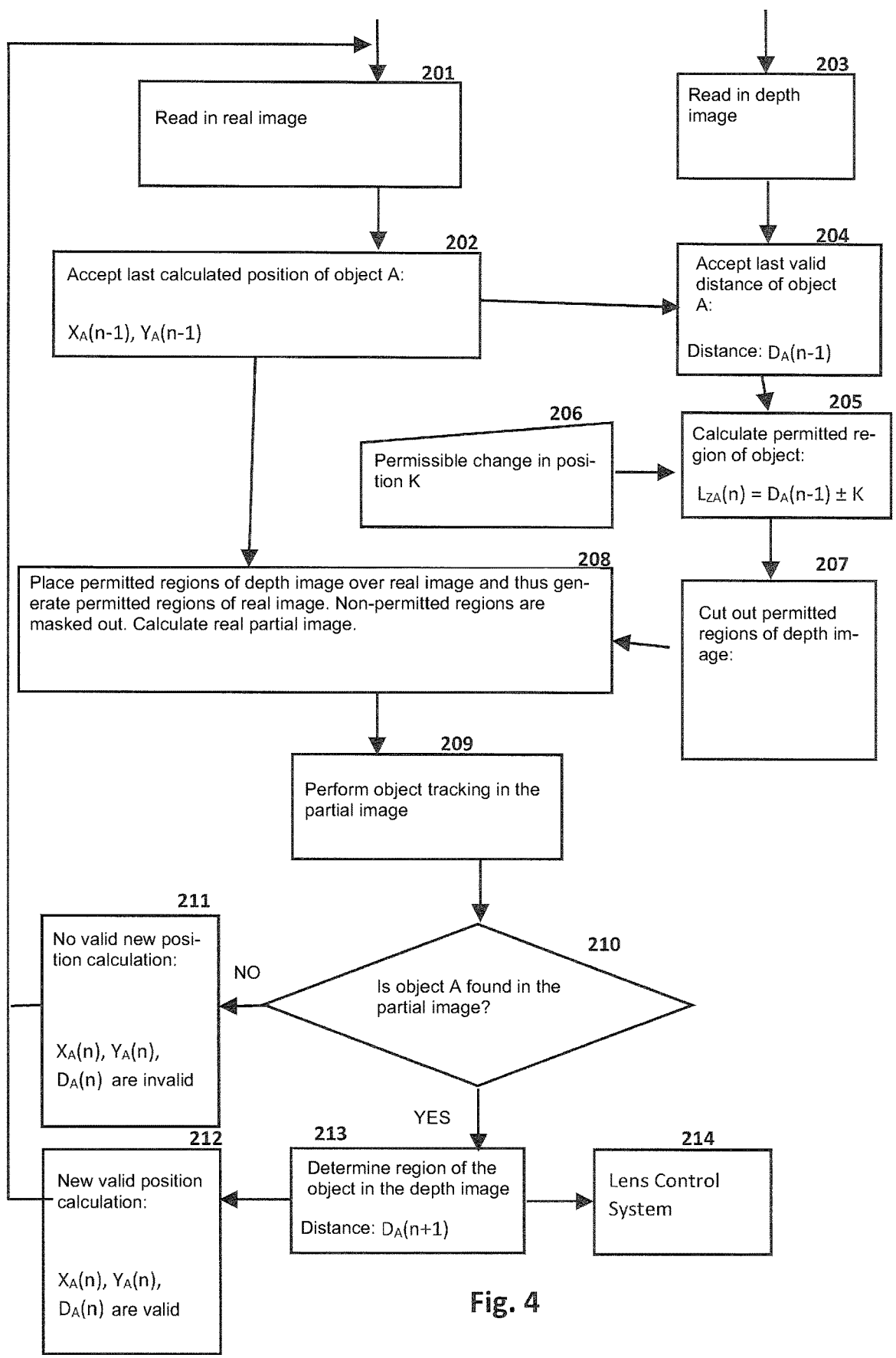
FIG. 4 shows a block diagram of a tracking process in an alternative embodiment according to the invention for focusing a camera.

Tracking an object can also be made more robust by reducing the search range of a tracking algorithm through segmentation or regional restriction of the real image. Segments or regions where searching is not allowed because they are physically impossible (because they are outside the possible movement range of the object) can make the algorithm faster, more efficient, and more robust. FIG. 4 shows the schematic structure of the algorithm.

In the first step, the real image of a camera 1 or of the 3D sensor 2 is read in (201). In the next step, the last valid calculated position $X_A(n-1)$, $Y_A(n-1)$ of the tracked object A is taken over (202). In addition, the depth image is read out from the 3D sensor (203) and the last valid distance $D_A(n-1)$ is taken over (204). With the help of the allowed position change K per sampling interval (206), the distance range $L_{ZA}(n)=D_A(n-1)\pm K$ can be calculated, in which the object may be physically located (205). All points of the depth image which are outside the allowed range can be set to zero or blacked out (207). This indicates the allowed segment or region. The allowed region of the depth image can now be placed as an overlay over the real image. All regions of the real image are hidden or blacked out themselves if they lie in areas of the depth image which are not allowed (208). Thus, the impermissible regions in the real image are faded out and are no longer visually apparent. The real image has been reduced in size as a partial image. Object tracking can now be performed in this image (209). Objects, e.g. faces, are now no longer visible in the real image if they are located at impermissible distances from the camera. It is now only possible to track objects in a restricted partial image. The partial image visually displays the physically possible regions of the original real image. If the desired object A is still present in the partial image (210), a new tracking position $X_A(n)$, $Y_A(n)$ is calculated for object A (212). This position and the associated new distance $D_A(n)$ of object A now calculated from the depth image (213) can be passed for the next image to be tracked. Ideally, the newly obtained values are still run through a Kalman filtering. The new valid distance $D_A(n)$ is used for the focus adjustment and transmitted to the lens control system (214) to adjust the focus of the camera accordingly. If no new valid distance was determined, the focus remains at its last valid position until a new valid value is calculated.

The invention claimed is:

1. A method for focusing a camera, comprising:
dividing, with a computing unit of the camera, a field of view of the camera into at least two segments;
assigning, in each case, at least one operating element or at least one position of an operating element to the at least two segments;
recognizing and tracking at least one object in each of the at least two segments;
automatically assigning the recognized at least one object to the at least one operating element or the at least one position of the operating element depending on which segment the at least one object is assigned to, for each of the at least two segments;
actuating the at least one operating element in order to shift the focus of the camera from one object to the object automatically assigned to the actuated operating element or the position of the operating element; and
focusing the camera on the at least one object assigned to the at least one operating element or the position of the at least one operating element in response to the at least one operating element being actuated or the at least one operating element being brought into a corresponding position by shifting the focus to the plane of the object assigned to this operating element or position of the operating element, wherein the speed of the shifting to the plane of the object is set by a focus ramp.

2. The method according to claim 1, characterized in that the automatic assignment of the at least one object to one operating element or position of an operating element is maintained if at least one object moves to another segment to which it is not assigned.

3. The method according to claim 1, characterized in that the at least one operating element is a knob, rotary knob, joystick or slider having at least two positions.

4. The method according to claim 1, characterized in that depth data is recorded at least in a part of the field of view of the camera and at least a part of a number of image components of the field of view are assigned to these depth data, and before the assignment a further camera records a real image and at least a part of the image components of the real image are assigned to the depth data.

5. The method according to claim 4, characterized in that the at least two segments are at least partially delimited not only by side edges but also by depth edges.

6. The method according to claim 1, wherein the at least one object is visually recognized and tracked in the field of view of the camera, characterized in that depth data is acquired at least in a portion of the field of view of the camera and assigned to at least a portion of a number of image components of the field of view, and in that at least a portion of the depth data is used for recognizing and tracking the at least one object.

7. The method according to claim 1, characterized in that depth data is acquired at least in a portion of the field of view of the camera, and are associated with at least a portion of a number of image components of the field of view, and in that at least a portion of the depth data is used for visual recognition and tracking of the at least one object.

8. The method according to claim 1, characterized in that one of the at least two segments is defined in the field of view of the camera and is focused on a recognized and tracked object as soon as it is located in the at least one segment.

9. The method according to claim 1, characterized in that the at least one object is assigned a maximum movement range per time unit and this movement range is included in recognizing and tracking the at least one object.

10. The method according to claim 9, characterized in that the at least one object is assigned to an object class and the maximum movement range is selected depending on the object class.

11. The method according to claim 1, characterized in that recognizing the at least one object includes feature analysis in which visual features of an object in an area are searched, analyzed and identified, and the object is recognized based on these features and its movement is tracked.

12. The method according to claim 1, characterized in that the object recognition comprises recognition via a deep-learning algorithm.

13. The method according to claim 6, characterized in that the depth data is acquired at least in part via at least one 3D sensor attached to the camera.

14. The method according to claim 4, characterized in that a further camera records a real image and at least some of the image components of the field of view are assigned to the depth data.

15. The method according to claim 7, characterized in that the depth data is acquired through triangulation of data from at least two auxiliary cameras.

16. A method for focusing a camera, comprising:
dividing, with a computing unit of the camera, a field of view of the camera into at least two segments, wherein the least two segments are at least partially delimited by depth edges;
assigning, in each case, at least one operating element or at least one position of an operating element to the at least two segments;
recognizing and tracking at least one object in each of the at least two segments;
permanently recording depth data of the at least one object in each of the at least two segments;
automatically assigning the recognized at least one object to the at least one operating element or the at least one position of the operating element depending on which segment the at least one object is assigned to, for each of the at least two segments;
actuating the at least one operating element in order to shift the focus of the camera from one object to the object automatically assigned to the actuated operating element or the position of the operating element; and
focusing the camera on the at least one object assigned to the at least one operating element or the position of the at least one operating element in response to the at least one operating element being actuated or the at least one operating element being brought into corresponding position by using the recorded depth data of the object, wherein the speed of the shifting to the plane of the object is set by a focus ramp.

17. A method for focusing a camera, comprising:

dividing, with a computing unit of the camera, a field of view of the camera into first and second segments;

assigning a first position of an operating element to the first segment and a second position of the operating element to the second segment;

recognizing and tracking a first object in the first segment and a second object in the second segment;

automatically assigning the first object to the first position of the operating element and the second object to the second position of the operating element;

actuating the at least one operating element in order to shift the focus of the camera from one object to the object automatically assigned to the actuated operating element or the position of the operating element; and focusing the camera on the first object in response to the at least one operating element being activated, such that it is disposed in the first position and focusing the camera on the second object in response to the at least one operating element being activated, such that it is disposed in the second position, wherein the speed of the shifting to the plane of the object is set by a focus ramp.

18. The method of claim 17, further comprising maintaining a tracking of the second object in response to focusing the camera on the first object.

19. The method of claim 18, further comprising maintaining data associated with a focus of the camera with respect to the second object in response to focusing the camera on the first object, wherein the focus of the camera with respect to the second object is determined based on the tracking of the second object.

20. The method of claim 1, wherein a plurality of objects are included in each of the at least two segments, and wherein a plurality of operating elements or a plurality of positions of the operating elements are assigned to respective ones of the plurality of objects.

21. The method of claim 1, wherein a speed of a transition associated with focusing the camera is dependent on a speed of movement associated with the at least one operating element.

22. The method of claim 1, wherein a direction of movement of the at least one operating element corresponds to a direction associated with shifting the focus.

23. The method of claim 1, wherein actuating the at least one operating element causes the focus of the camera to shift from the one object to the object automatically assigned to the actuated operating element or the position of the operating element.

* * * * *